J. W. H. BLEE AND A. P. POWELL.
CABLE COUPLING.
APPLICATION FILED FEB. 7, 1921.

1,407,370.

Patented Feb. 21, 1922.

WITNESSES

INVENTOR
J. W. H. BLEE,
A. P. POWELL,
BY
ATTORNEYS

UNITED STATES PATENT OFFICE.

JOHN WILLIAM HARVEY BLEE AND ARTHUR PERRY POWELL, OF HARRISON, IDAHO.

CABLE COUPLING.

1,407,370.        Specification of Letters Patent.    Patented Feb. 21, 1922.

Application filed February 7, 1921. Serial No. 443,297.

*To all whom it may concern:*

Be it known that we, JOHN WILLIAM HARVEY BLEE and ARTHUR PERRY POWELL, citizens of the United States, and residents of Harrison, in the county of Kootenai and State of Idaho, have invented certain new and useful Improvements in Cable Couplings, of which the following is a specification.

Our invention relates to couplings for cables, ropes and the like, and the purpose of our invention is the provision of a cable coupling by means of which a rapid coupling and uncoupling of two lengths of cable can be effected, and without the possibility of the coupling being accidentally uncoupled. The various uses to which the invention may be adapted are apparent, and although we have described the coupling as used in connection with cables, it is to be understood that it can be employed to connect any two elements where a flexible connection between the two elements is desired.

We will describe one form of coupling embodying our invention and will then point out the novel features thereof in claims.

In the accompanying drawings.

Similar reference characters refer to similar parts in each of the views.

Figure 1:
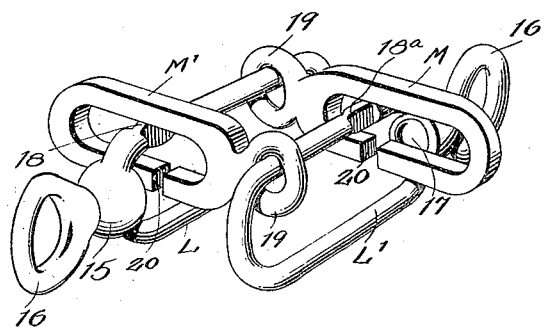
Figure 1 is a view showing in perspective one form of coupling embodying our invention with the parts thereof coupled and in position for uncoupling.
Figure 3:
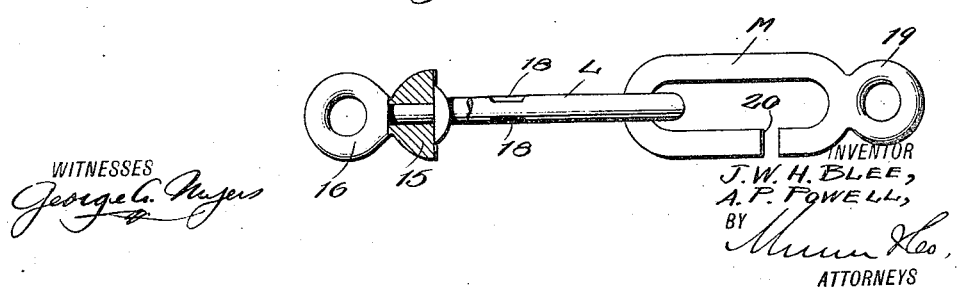
Figure 3 is a detail view showing one of the coupling members in side elevation and partly in section.

Referring specifically to the drawings and particularly to Figure 1, our invention in its present embodiment consists of companion coupling members designated generally at L and L'. As shown in Figure 3, each coupling member is provided at one of its ends with a head 15 to which an eye 16 is swivelly connected by means of an extension 17 formed on the eye and rotatably mounted within the head. Adjacent the head 15 the link L or L' is recessed at opposite points as indicated at 18 or 18$^a$, the purpose of these recesses being to provide an entrance portion to permit the connecting of the connecting link with a coupling link.

Each companion coupling member K or K' also includes a coupling link M or M' which is provided at one end with a rigidly sustained eye 19, and adjacent this end the link is split as indicated at 20 to provide an entrance opening for the assembling of the link with one of the coupling links. The eye 19 of each link M or M' is adapted to slidably receive the connecting link L or L', as shown, so that the coupling link is slidably and permanently connected to the connecting link.

Figure 2:
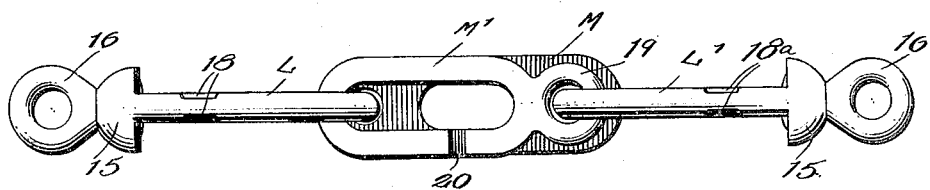
Figure 2 is a view showing in side elevation the coupling shown in Figure 1 with the parts of the coupling occupying the finally coupled position.

In practice, the swivel eyes 16 of the connecting links L and L' are adapted to be connected to the confronting ends of a cable, while the coupling links M and M' are connected to the connecting links L' and L, respectively. One manner of associating the coupling links with the connecting links is clearly illustrated in Figure 1 wherein it will be seen that the connecting links are arranged in parallelism with their recessed portions 18 and 18$^a$ disposed at the upper edge of the links. The coupling links occupy right angular positions with respect to their corresponding connecting links, and are so disposed that the gap 20 will aline with the recessed portions 18 and 18$^a$. When the several links are so associated with each other, it will be clear that by moving the coupling links downwardly in the direction of the connecting links, the recessed portions of the connecting links will pass through the gaps of the coupling links so that the coupling link of one coupling member will be embraced by the connecting link of the other coupling member. With the several links connected in this manner, it will be manifest that when the two connecting links L and L' are pulled in opposite directions, the coupling links will be moved to the confronting ends of the connecting links so that they are now disposed side by side as clearly shown in Figure 2. In this position of the links, the gaps 20 are displaced from the recessed portions 18 and 18$^a$ so that the accidental uncoupling of the coupling members is rendered practically impossible. It is this position that the several links occupy when the coupling is in actual use, that is when tension is exerted on the coupling links.

Should the links be moved to any angular position with relation to each other, the gaps of the coupling links will still remain displaced from the recessed portions so that the accidental disengaging of the coupling links and connecting links is prevented. It will be apparent, however, that when it is desired to disengage one coupling member from the other, it can be readily accomplished by moving the several links to the position shown in Figure 1, whereby the coupling links can be readily disengaged from the connecting links.

Although we have herein shown and described only one form of coupling embodying our invention, it is to be understood that various changes and modifications may be made herein without departing from the spirit of the invention and the spirit and scope of the appended claims.

What we claim is:

1. A coupling comprising, companion coupling members, each of said members comprising a connecting link and a coupling link permanently and slidably connected to the connecting link, each of said coupling links being detachably associated with the connecting link of the other coupling member.

2. A coupling comprising, companion coupling members each including a connecting link and a coupling link slidably and permanently connected to the connecting link, each of said coupling links being split to provide a gap, and each of said connecting links being formed with a relatively thick portion which may be passed through said gap to permit of the association of the coupling link of one member with the connecting link of the other member.

3. A coupling comprising, companion coupling members, each member including a connecting link and a coupling link, a swivelled eye formed on each connecting link, a rigid eye formed on each coupling link and slidably receiving the corresponding connecting link, each coupling link being split at a point adjacent the rigid eye, and each connecting link being recessed adjacent the swivelled eye, for the purpose described.

JOHN WILLIAM HARVEY BLEE.
ARTHUR PERRY POWELL.